March 16, 1943.  D. W. McLENEGAN  2,314,232
AIR CONDITIONING CONTROL SYSTEM APPARATUS
Filed July 1, 1942
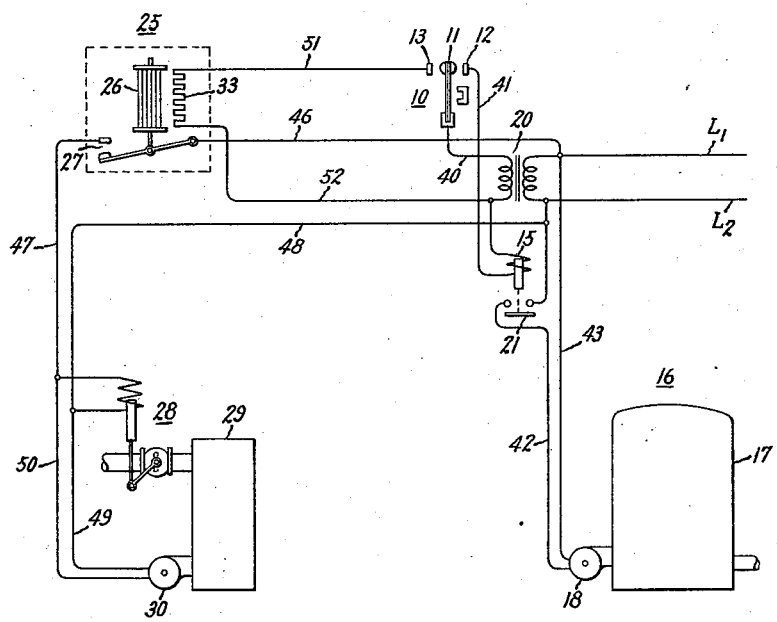
Inventor:
David W. McLenegan,
by Harry E. Dunham
His Attorney.

Patented Mar. 16, 1943

2,314,232

UNITED STATES PATENT OFFICE 2,314,232

AIR CONDITIONING CONTROL SYSTEM AND APPARATUS

David W. McLenegan, Caldwell, N. J., assignor to General Electric Company, a corporation of New York Application July 1, 1942, Serial No. 449,254

3 Claims. (Cl. 236—44)

The invention relates to air conditioning control systems and apparatus and particularly to room air conditioning control systems employing both automatic heating control means and automatic humidifying control means to maintain desired conditions of temperature and humidity of the room air.

With the ordinary type of room construction, it is necessary to lower the room air humidity when the outdoor temperature decreases to a low value in order to prevent the condensation of moisture on windows or within the outside walls of the room. However, it ordinarily is desirable to maintain as high relative humidity of the room air as outdoor temperature and the limitations of ordinary building construction permits. Therefore, it is desirable to provide automatic compensating control means for varying the relative humidity of the room air in relation to outdoor temperatures. This outdoor temperature compensating humidity control problem has long existed in the art and many different outdoor temperature responsive or window condensation responsive automatic compensating control means for accomplishing the desired result have been proposed. For example, the Crago Patent 2,166,799 discloses a room humidostat provided with a local electric air heater having its energization controlled by a rheostat that is operated by an outdoor temperature responsive thermostat for decreasing the standard of humidity maintained in the room air when the outdoor temperature decreases. Such an outdoor rheostatic energization control arrangement, however, requires the installation of a special weatherproof control rheostat and thermostat together with the interconnecting wiring, and thus leaves much to be desired in the way of a more simple and effective control system.

The principal object of the present invention is to provide an improved automatic humidostat compensating control for lowering the standard of relative air humidity indoors when the outdoor temperature decreases to a low value while enabling a higher relative humidity to be maintained in moderate winter weather.

In accordance with the present invention, the lowering of the humidity is accomplished by employing a humidostat provided with a local electric air heater, the same as disclosed in the Crago patent, and by connecting this heater to be controlled directly by the indoor heating control room thermostat instead of the special rheostat and outdoor temperature responsive thermostat employed by Crago. The room thermostat is specially arranged so that the local electric air heater for the humidostat is energized only during the time that the room heating plant is not operating and deenergized during the time that the room heating plant is operating.

Thus the improved humidostat compensating control combination utilizes a new and improved room thermostat timing control principle, namely, that as the outdoor temperature decreases, the heating plant will inherently be maintained in operation under the control of the room thermostat a greater percentage of the time than when the outdoor temperature is higher. To conform with this new and improved room thermostat timing control principle, the local electric air heater for the humidostat is provided with sufficient heat storage capacity to maintain a fairly uniform temperature of the room air adjacent the humidostat irrespective of the fact that the energization of the heater by the room thermostat necessarily will be of an intermittent character.

The invention will be better understood from the following description and drawing in which the single figure is a schematic circuit diagram of a room air conditioning control system embodying the invention in a preferred form.

As shown in the drawing, the room heating control means includes the room temperature responsive thermostat 10, preferably of the snap action type, having the blade 11 movable between the usual low temperature contact 12 and the special high temperature contact 13. Thermostat 10 by engagement of blade 11 with and disengagement from low temperature contact 12 controls the energization and deenergization of relay 15 to correspondingly start and stop operation of the room heating plant 16, illustrated diagrammatically as a house heating boiler 17 and an oil or gas burner 18. Relay 15 is shown connected to the low voltage secondary winding of the transformer 20 having its primary permanently connected to power supply lines L1, L2 from which the burner 18 is energized when the contact 21 of the relay is closed.

The room air humidity control means includes the room humidostat 25 shown diagrammatically as of the ordinary type having the humidity responsive hair operating elements 26 connected to mechanically move switch member 27 upon variations in the room air relative humidity. The humidostat contacts 27 are connected to control the energization of electromagnetic valve 28 for supplying water to the humidifying apparatus 29 provided with an air blower 30 for circulating room air over moistened surfaces to effect humidification thereof.

The humidostat 25 is provided with an electric local air heater 33 in order to raise the temperature of the air immediately adjacent the humidity responsive hair elements 26 above the temperature of the surrounding room air so as to vary the response of the humidostat by changing the air temperature in the manner described and claimed in the aforesaid Crago patent. In accordance with present invention, the electric local air heater 33 is provided with a suitable heat storage mass 33a and is connected to be energized and deenergized by the special high temperature contact 13 of the room thermostat 10. This combination tends to raise the standard of humidity maintained in the room in accordance with the time that the heating apparatus is not operating and to lower the standard of humidity maintained in the room in accordance with the time that the room heating apparatus is in operation. As shown in the drawing, this is accomplished by connecting the special high temperature contact 13 to energize the heater 33 from the secondary of the transformer 20 when the room thermostat blade 11 is in its high temperature contact position.

In operation, the room thermostat 10 will engage blade 11 with low temperature contact 12 only during the time that the room air temperature is below the desired value at which the thermostat 10 is set to respond. This will energize the operating winding of relay 15 from the secondary of transformer 20 through the conductors 40 and 41. The resulting closure of the relay contact thermostat 21 energizes the heater 18 from supply lines L1, L2 through conductors 42 and 43 so as to increase the supply of heat to the room and thereby raise the room temperature to the desired value.

The humidity responsive element 26 will respond to the relative humidity of the room air and close its contacts 27 whenever the room air relative humidity is below a desired value. The closure of contacts 27 will energize the electromagnetic valve 28 from the supply lines L1, L2 through conductors 46, 47 and 48 so as to supply water to the humidifying apparatus 29. At the same time the blower 30 is energized in parallel with magnet valve 28 through conductors 49 and 50 to pass air through the humidifying apparatus 29 and thereby raise the humidity of the room air.

When the temperature of the room air is at or above the desired value, thermostat blade 11 will engage its high temperature position contact 13 thereby energizing the humidostat local heater 33 from the secondary transformer 20 through conductors 40, 51 and 52. By properly proportioning the heating capacity and heat storage of the heater 33, different amounts of biasing or compensating effect can be obtained in varying the response of the humidostat. For example, if the auxiliary heater 33 is proportioned when continuously energized to raise the temperature of the air immediately adjacent the humidity responsive elements 26 9° F. above the surrounding or ambient room air, then the heater 33 will give the necessary biasing or compensating effect to change the ambient room air relative humidity from forty per cent to thirty per cent at any normal room temperature. This is due to the fact that the absolute moisture content of the ambient room air at, say, a temperature of 70° F. and forty per cent relative humidity is substantially the same as the locally heated humidostat air at 79° F. temperature and thirty per cent relative humidity. In this way, the heater 33 serves in effect to bias or recalibrate the humidostat 25 in accordance with the local humidostat air heating effect provided by the heater.

The electric heater 33 will be continuously energized only during the time that the room temperature is above the desired value and operation of the heating equipment 18 is not required due to the fact that the outdoor temperature is relatively high. Hence, the thermostat 25 will maintain the highest degree of absolute humidity in the room under these conditions. When the outside temperature decreases, the percentage of time that the burner 18 is operated by the thermostat 10 necessarily will increase. In case the outside temperature continues to decrease, the percentage of time that the heating apparatus 18 is in operation will further increase and the percentage of time of energization of the humidostat heater 33 will also decrease correspondingly. As a result, the standard of humidity maintained in the room by the humidostat 25 will be decreased correspondingly with the decrease in heater energization. When the lowest outside temperature is reached and the operating of the heating apparatus 18 is practically continuous, then the humidostat heater 33 will not be energized at all and the lowest standard of relative humidity will be maintained in the room.

Thus it will be seen that in accordance with the new and improved room thermostat timing principle of the present invention the need for an outdoor temperature responsive control for the humidostat heater 33 is eliminated and the desired results are obtained by connecting the heater to be controlled directly by the room heating control thermostat.

What I claim as new and desire to secure by Letters Patent of the United States, is:

1. In a room air conditioning system, in combination, room air heating means, automatic control means therefor including a room thermostat having a switch member movable between a low temperature circuit-closing position and a high temperature circuit-closing position responsively to variations in the room air temperature, room air humidifying means, automatic control means therefor including a humidostat responsive to variations in the room air relative humidity, an electric heater having heat storage means for maintaining the temperature of the air immediately adjacent said humidostat above the temperature of the surrounding room air to regulate the response of said humidostat, and means controlled by said thermostat for energizing said heater only when said switch member is in said high temperature circuit-closing position.

2. In a room air conditioning system, in combination, automatic heating control means including a room thermostat having a switch member movable between a low temperature circuit-closing position and a high temperature circuit-closing position responsively to variations in the room air temperature, automatic humidifying control means including a humidostat responsive to variations in the room air relative humidity, an electric local air heater for increasing the temperature of the air immediately adjacent said humidostat above the temperature of the surrounding room air to regulate the response of said humidostat, and means controlled by said thermostat for energizing said heater only when said switch member is in said high temperature circuit-closing position.

3. In a room air conditioning system, in combination, a thermostat responsive to variations in the room air temperature from a desired value, automatic humidifying control means including a humidostat responsive to variations in the room air relative humidity, an electric local air heater for increasing the temperature of the air immediately adjacent said humidostat above the temperature of the surrounding room air to regulate the response of said humidostat, and means controlled by said thermostat for energizing said heater only during the time the room air temperature is above said value.

DAVID W. McLENEGAN.